June 11, 1968

W. R. WALTERS 3,387,620

BALL COCK VALVE ASSEMBLY

Filed June 16, 1965

William R. Walters
INVENTOR.

BY *Clarence A. O'Brien*
and *Harvey B. Jacobson*
Attorneys

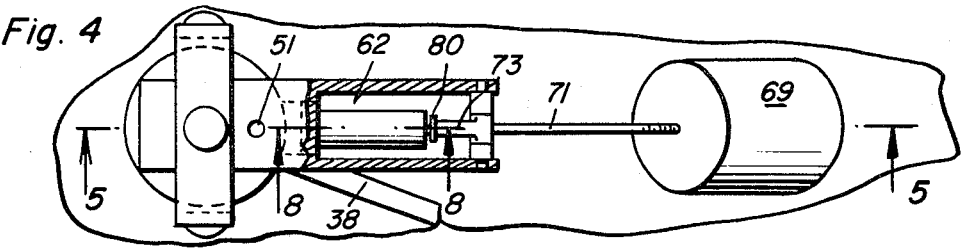
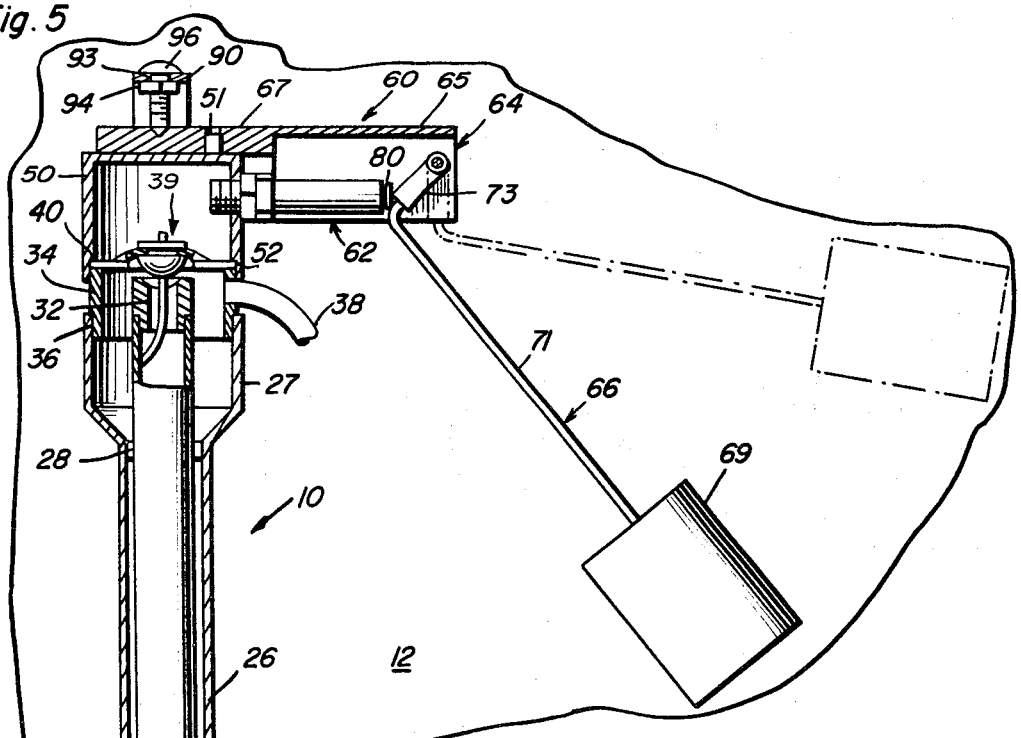
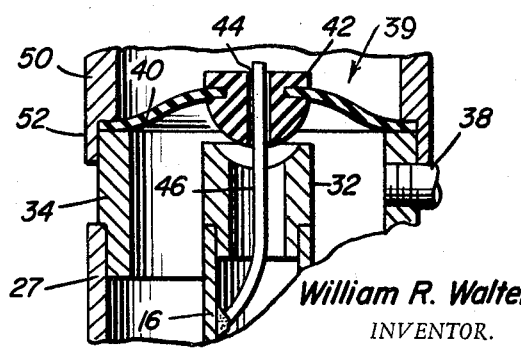
William R. Walters
INVENTOR.

United States Patent Office 3,387,620
Patented June 11, 1968

3,387,620
BALL COCK VALVE ASSEMBLY
William R. Walters, 1300 Sunset,
Pawhuska, Okla. 74056
Filed June 16, 1965, Ser. No. 464,376
7 Claims. (Cl. 137—244)

ABSTRACT OF THE DISCLOSURE

A float controlled fluid pressure actuated filling valve assembly adapted to maintain a predetermined liquid level in a receptacle which valve assembly includes a supply conduit associated valve port, a diaphragm valve element mounted for movement toward and away from the valve port to control the flow of liquid through the port, a small diameter through aperture in the valve element which communicates the supply conduit with a chamber within which pressure built up by the supply liquid acts to move the diaphragm into sealing relation to the valve port, a float actuated spring biased normally closed valve associated with the chamber to vent the chamber in response to a liquid level in the receptacle below that desired so as to permit flow of supply liquid through the valve port and a valve element aperture cleanout rod fixed to the supply conduit to preclude total blockage of the valve element aperture.

---

This invention relates generally to an improved ball cock valve assembly of the type designed for use in flushing tanks for water closets. More specifically, this invention relates to a ball cock valve assembly which is provided with improved means for automatically closing when the level of the liquid in the flushing tank reaches a predetermined level.

It is a primary object of this invention to provide a novel and improved float controlled ball cock valve assembly which is characterized by a snap-action opening and closing operation thereby substantially precluding the disturbing hissing noise normally associated with many ball cock valve assemblies known heretofore.

It is another object of this invention to provide a ball cock valve assembly of the nature described which comprises a float controlled fluid pressure operated diaphragm valve to selectively regulate the inflow of water into the flushing tank.

A further object of this invention is to provide a simplified but dependable means for effecting the snap action of the diaphragm of the valve assembly utilized in the device of the present invention.

Still another object of this invention is to provide a construction wherein a malfunctioning of the shut-off float within the flushing tank will retain the inlet diaphragm valve in a closed position.

Still a further object of this invention is to provide an improved ball cock valve assembly which is simple in construction, readily assembled, and disassembled for repair, and which is relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged top elevational view of the present device with portions broken away to show certain details of the valve actuating means;

FIGURE 5 is an enlarged vertical sectional view of the device taken substantially along the plane of the line 5—5 of FIGURE 4, further showing the device operatively positioned within a flushing tank, or the like;

FIGURE 6 is an enlarged vertical sectional view of a portion of the device shown in FIGURE 5, illustrating the diaphragm valve means of the present valve assembly in an open position;

Figure 1:
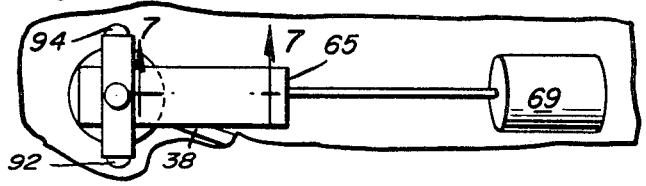
FIGURE 1 is a top plan view of the ball cock valve assembly of the present invention.
Figure 2:
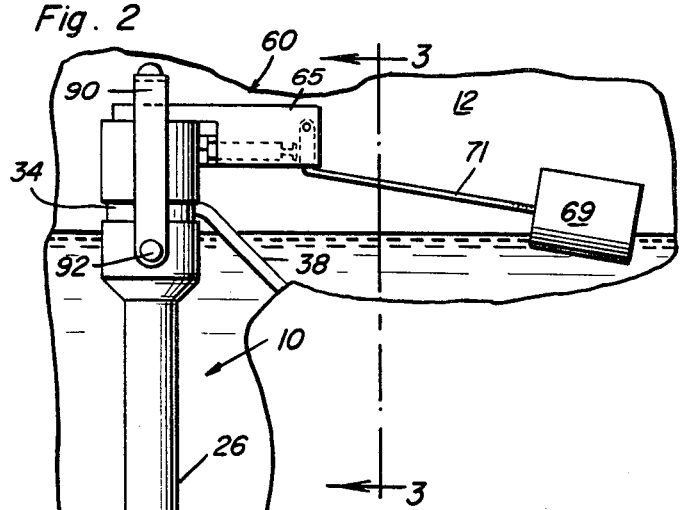
FIGURE 2 is an enlarged side elevational view of the ball cock assembly of FIGURE 1 further showing the valve assembly secured within a toilet bowl flushing tank, only a portion of which is shown.
Figure 3:
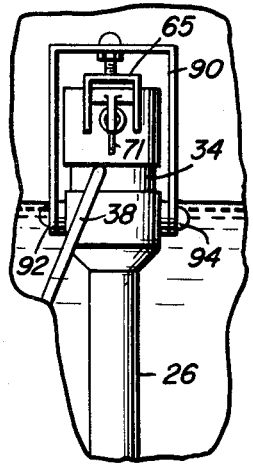
FIGURE 3 is a fragmentary front elevational view of a portion of the device of FIGURE 2 as taken substantially along the plane of line 3—3 of FIGURE 2.

Referring now to the drawings and to FIGURES 2 and 5 in particular, a ball cock valve assembly indicated generally at 10 is shown as operatively positioned within a flushing tank 12 or the like. The ball cock valve assembly 10 is secured to the bottom portion 14 of the tank 12 in a conventional manner whereby an inlet pipe 16 having a threaded lower portion 18 is provided with a packing member 20, which assembly is clampingly secured in a suitable aperture in the bottom 14 of the tank 12 by means of a clamping nut 22. A water supply line 24 is sweated to or threadably received by the inlet pipe 16 for the purpose of supplying water to the interior of the flushing tank 12.

While the ball cock valve assembly comprising the present invention will be described, for purposes of illustration only, in conjunction with a toilet bowl flushing tank it will be understood that the valve assembly 10 of the present invention may be utilized in numerous other devices where it is desirable to maintain a liquid at a predetermined level.

A concentric discharge tube 26 is secured to the outer diameter of the inlet tube 16 such as at points 28 and 30, in such a manner so as to permit a substantially free flow of fluid past the points 28 and 30. The bottom end of the discharge tube 26 terminates a short distance above the bottom 14 of the tank 12 to permit a free flow of fluid from the tube 26 into the tank 12. The upper portion of the discharge tube 26 is characterized by an enlarged annular, or bell-shaped portion 27.

A renewable valve seat 32 is secured to the upper end of the inlet pipe 16 by means of a pressed fit, or by being threadably received therein, for example. An annular collar 34 provided with a stepped shoulder 36 is removably received by the upper portion 27 of the discharge tube 26. The annular collar 34 is further provided with a suitable aperture for the reception of a re-fill tube 38 which may be secured by means of sweating, or swedging, for example. Although not shown, the re-fill tube 38 leads to an overflow tube such as that utilized in a conventional flushing valve assembly for toilet bowl flushing tanks. A flushing valve assembly has not been illustrated inasmuch as it is not a part of the present invention.

A diaphragm valve means 39 includes a resilient diaphragm member 40 equal in diameter to the annular collar 34 which is positioned on top of the collar 34. The diaphragm 40 carries a relatively rigid yet resilient valve member 42 engaged in an aperture therein as seen best in FIGURES 5 and 6. As seen best in FIGURE 6 the valve member 42 has an orifice or aperture 44 therethrough which functions to permit a limited flow of fluid from the inlet pipe 16 into the region above the diaphragm. A cleaning needle or orifice regulating means 46 is rigidly secured within the inlet tube 16 adjacent the upper portion thereof, by means of welding for example, to provide a guide and cleaning means for the orifice 44 as the valve member 42 carried by the diaphragm 40 moves up and down in a manner to be described. Accordingly, the upper portion of the orifice cleaning and valve guide needle 46 is of sufficient length so as to insure that the valve member 42 does not travel off the needle 46 when the diaphragm 40 is in its uppermost position as shown in FIGURE 6.

A diaphragm valve actuating means indicated generally at 60 includes a cup-shaped chamber, or pressure cap 50 having a step shoulder 52 removably received by the annular ring 34 with the outer periphery of the diaphragm 40 retained between the shoulder 52, an actuating valve means 62, a float support means 64 and a float assembly 66. The actuating means 60 is provided to actuate the diaphragm 40 and its associated valve member 42 to regulate the inflow of water passing through the valve seat 32, down into the bell-shaped portion 27, down the annular conduit defined by the inlet pipe 16 and the discharge tube 26 thus flowing into the interior of the flush tank 12.

Figure 7:
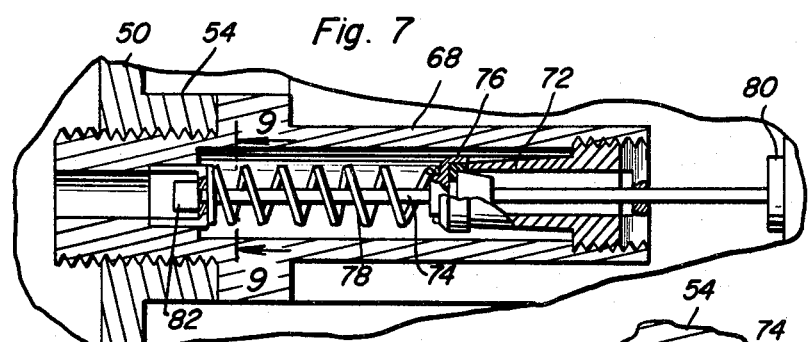
FIGURE 7 is an enlarged fragmentary vertical sectional view of a portion of the diaphragm valve actuating means taken substantially along the plane of the line 7—7 of FIGURE 1.
Figure 8:
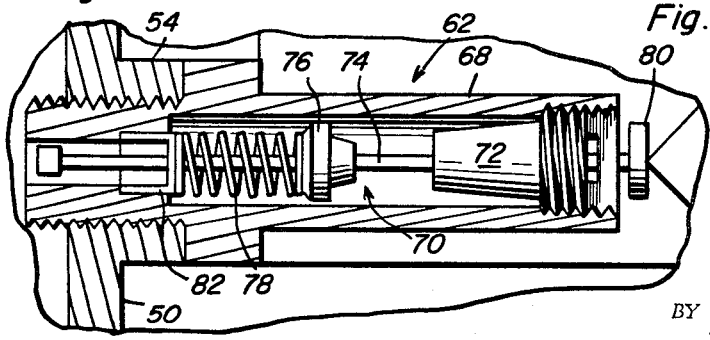
FIGURE 8 is an enlarged fragmentary vertical sectional view of the means of FIGURE 4, illustrating the position of the actuating means when the flushing tank is being filled.
Figure 9:
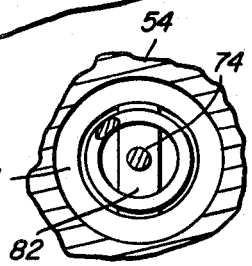
FIGURE 9 is a fragmentary vertical sectional view taken substantially along the plane of the line 9—9 of FIGURE 7.

As seen best in FIGURES 7 and 8, the pressure cap 50 is provided with a suitably threaded boss 54 in the side wall thereof in which is threadably received the valve actuating means 62. The valve actuating means 62 includes a body portion 68 within which is housed a spring-biased valve means indicated generally at 70, which includes a valve seat and guide 72 threadably received in the outer end of the body 68, and a valve stem 74 upon which is fixedly secured a valve body 76 which is biased into a normally closed position by a helical spring 78 as seen best in FIGURE 7. In the normally off position the valve stem 74 extends outwardly from the body 68 of the actuating means 62. The valve stem 74 terminates in a disk-like bulbous portion 80. As seen best in FIGURES 7, 8 and 9 the member 74 is slidably received in a suitable aperture in the valve seat and guide member 72 and an inner guide member 82 adjacent the end of the valve actuating means 62 threadably received in the boss 54.

The float support means 64 comprises a generally U-shaped downwardly opening channel portion 65 having an outwardly projecting integral projection 67. A float 69 which is preferably formed of a lightweight water-impermeable synthetic resin is secured to a float lever 71 which is rigidly secured to, or integrally formed with, a striker bar 73, which bar is pivotally secured within the generally U-shaped channel member 65 adjacent the outer end thereof, as seen best in FIGURE 4, with the striker bar 73 operatively positioned so as to coact with the disk-shaped bulbous portion 80 of the actuating valve means 62.

A pin 51 is provided in the upper portion of the cup-shaped pressure chamber 50. The outwardly projecting portion 67 of the generally U-shaped member 65 is slidably received on the pin 51 by means of a suitable aperture in the portion 67. The major components of the ball cock valve assembly 10 are held in the assembled relationship shown by a bail 90 which is pivotally secured to the portion 27 of the discharge tube 26 by means of a pair of suitable headed pins 92 and 94. As seen best in FIGURE 5 the bight portion of the bail 90 is provided with aperture 93 and, a threaded nut 94 preferably in alignment with the aperture 93 within which is threadably received a threaded bolt 96. It will therefore be understood that by tightening the bolt 96 against the portion 67, the various removable components of the ball cock valve assembly 10 may be retained in their assembled sealed relationship as shown in FIGURE 5.

The operation of the ball cock valve assembly 10 will be described by first referring to FIGURES 5 and 8. As seen in FIGURE 5, the flushing tank 12 does not contain any water and accordingly, the float 69 is in its lowermost position as shown in full lines. In this condition the striker bar 73 is in contact with the bulbous portion 80 of the valve stem 74 and is retaining the valve body 76 in the position shown in FIGURE 8 against the bias of the spring 78 thereby venting the interior of the pressure chamber 50 to atmosphere thus permitting the pressure of the water in the inlet pipe 16 to move the diaphragm 40 into the position as seen in FIGURES 5 and 6.

It will therefore be seen that the water is free to flow through the valve seat 32 down the discharge tube 26 and into the tank 12. In addition, a small proportion of water flows through the aperture 44 provided in the valve body 42 thus slowly filling the pressure chamber 50 with water. At the same time a certain amount of the water flowing through the seat 32 will flow into the refill pipe 38 to adjust the level of the water in the toilet bowl, not shown.

As the water level within the flushing tank 12 rises the float 69 will move into the broken line position shown in FIGURE 5, in doing so, the striker bar 73 will slowly permit the valve stem 74 to move toward the position shown in FIGURE 7. As the valve body 76 is moving toward the position shown in FIGURE 7 water will continue to flow into the pressure chamber 50 which is still vented through the actuating valve means 62. However, as soon as the float has reached the broken line position shown in FIGURE 5, the spring 78 will move the valve body 76 into the closed position shown in FIGURE 7 thereby sealing the pressure chamber 50.

Accordingly, the valve member 42 carried by the diaphragm 40 will snap downwardly into sealing engagement with the valve seat 32 due to a sudden pressure build-up within the chamber 50 by virtue of the fact that the pressure of the water supply is applied against the diaphragm 40 to force the valve member 42 is closed position, owing to the greater differential area of the diaphragm 40 which is exposed to the pressure in the chamber 50 as compared to the area of the valve member 42 which is exposed to the pressure of the water in the line 16 thereby maintaining the valve member 42 in the closed position as long as such water pressure is applied to the pressure chamber 50 through the orifice 44 with the valve means 62 in the closed position.

When the water level in the flushing tank 12 drops, such as when flushing the toilet, the float 69 will drop thereby re-opening the valve actuating means 62 thus venting the pressure chamber 50 thereby permitting the water pressure in the inlet pipe 16 to overcome the pressure in the chamber 50 thus permitting water to flow past the valve seat 32 to refill the flushing tank 12.

From the foregoing, it will be seen that the flushing tank 12 will refill at a substantially constant rate without substantial reduction of the flow of the water into the tank 12 until the instant that the valve means 62 closes at which time the diaphragm 40 will rapidly snap the valve member 42 into the off position thus precluding a throttling of the water such as ordinarily causes a disturbing hissing noise in many ball cock valve assemblies known heretofore.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A float controlled filling valve assembly adapted to maintain a predetermined liquid level in a receptacle comprising in combination, a supply conduit receiving liquid under pressure from a source and discharging said liquid into a receptacle, a valve seat in said conduit comprising a valve port through which liquid from said conduit is adapted to flow when entering said receptacle, diaphragm valve means mounted for movement toward and away from said valve seat and cooperating therewith to open and close said valve port and control the liquid flow through said valve port, an orifice through said diaphragm valve means, said orifice communicating with said supply conduit to permit a limited flow of liquid from said conduit into a diaphragm valve means actuating chamber to substantially close said valve port, said diaphragm valve means actuating chamber being provided with a normally closed actuating valve means to permit selectively venting pressure built up within said actuating chamber by said supply liquid to permit said diaphragm valve means to move away from said valve seat to open said valve port, a float assembly provided with a float adapted to float in the liquid in said receptacle and to move in accordance with the liquid level, said float assembly being provided with means to open and permit closing of said actuating valve means in response to liquid level in a receptacle to move said diaphragm valve means into sealing engagement with said valve port in response to a pressure build-up within said diaphragm valve means actuating chamber when said float has reached a predetermined maximum liquid level and an orifice cleaning means fixed to said supply conduit and projecting outwardly through said valve port and through said orifice in said diaphragm valve means, said orifice cleaning means comprising a needle sized so as to permit flow of liquid thereby and said needle being of sufficient length to normally preclude disengagement of said needle from said orifice whereby said needle provides a cleaning means for said orifice to prevent blockage thereof.

2. The combination of claim 1 including a discharge conduit concentrically disposed about said supply conduit, said discharge conduit being in communication with said supply conduit when said diaphragm valve means is away from said valve port.

3. The combination of claim 2 including means carried by said discharge conduit to retain said diaphragm, said diaphragm actuating chamber, and said float means in a releasably secured assembled relationship whereby said means may be readily disassembled for servicing thereof.

4. The combination of claim 3 including a bail means pivotally secured to said discharge conduit adjacent an end thereof adjacent said valve port, said bail means being adapted to releasably clamp said diaphragm valve means, said diaphragm valve means actuating chamber and said float assembly in operative relation to said discharge and supply conduits.

5. The combination of claim 1 wherein said diaphragm valve means includes a resilient diaphragm provided with a relatively rigid and resilient valve member centrally disposed therein.

6. The combination of claim 5 wherein said valve member seats against a renewable valve seat carried by said supply conduit.

7. The combination of claim 1 wherein said diaphragm actuating valve means comprises a normally closed valve carried by said actuating chamber, said valve being adapted to vent said actuating chamber in response to the dropping of the liquid within the receptacle below a predetermined point.

References Cited
UNITED STATES PATENTS

| | | | |
|---|---|---|---|
| 2,240,102 | 4/1941 | Textor | 137—414 |
| 2,588,242 | 3/1952 | Hunter | 251—46 X |
| 2,608,990 | 9/1952 | Crockett | 137—413 |
| 2,655,172 | 10/1953 | Owens | 137—413 |
| 2,681,661 | 6/1954 | Sogn et al. | 137—414 X |
| 2,799,290 | 7/1957 | Svirsky | 137—414 |
| 3,285,277 | 11/1966 | Goldtrap | 137—414 |

ALAN COHAN, *Primary Examiner.*

D. R. MATTHEWS, *Assistant Examiner.*